United States Patent
Schmitz

(10) Patent No.: US 6,793,997 B2
(45) Date of Patent: Sep. 21, 2004

(54) PLASTIC MOLDING HAVING TWO OR MORE LAYERS AND ANTISTATIC PROPERTIES

(75) Inventor: Guido Schmitz, Duelmen (DE)

(73) Assignee: Degussa AG, Duesseldorf (DE)

(*) Notice: Subject to any disclaimer, the term of this patent is extended or adjusted under 35 U.S.C. 154(b) by 311 days.

(21) Appl. No.: 09/865,687

(22) Filed: May 29, 2001

(65) Prior Publication Data

US 2001/0050478 A1 Dec. 13, 2001

(30) Foreign Application Priority Data

May 26, 2000 (DE) .......................................... 100 25 707

(51) Int. Cl.[7] .......................... B32B 1/08; B32B 27/08; B32B 27/00; B29D 23/00; B29D 22/00
(52) U.S. Cl. ................ 428/36.9; 428/36.91; 428/473.5; 428/475.8; 428/474.7; 428/474.4; 428/35.7; 138/137
(58) Field of Search ............................... 428/36.9, 35.7, 428/36.91, 474.4, 473.5, 475.8, 474.7; 138/137, 124, 126, 141; 524/495, 496

(56) References Cited

U.S. PATENT DOCUMENTS

| | | | |
|---|---|---|---|
| 5,382,359 A | | 1/1995 | Brandt ........................ 210/243 |
| 5,636,875 A | * | 6/1997 | Wasser ........................ 285/21.1 |
| 5,937,911 A | * | 8/1999 | Kodama et al. ............. 138/137 |
| 6,089,277 A | * | 7/2000 | Kodama et al. ............. 138/126 |
| 6,316,537 B1 | * | 11/2001 | Baumann et al. ........... 524/496 |

FOREIGN PATENT DOCUMENTS

| | | |
|---|---|---|
| DE | 26 35 363 | 2/1978 |
| EP | 0 745 763 | 12/1996 |

* cited by examiner

*Primary Examiner*—Harold Pyon
*Assistant Examiner*—Catherine A. Simone
(74) *Attorney, Agent, or Firm*—Oblon, Spivak, McClelland, Maier & Neustadt, P.C.

(57) ABSTRACT

The molding of the present invention has a continuous conducting path from an inner to an outer surface, comprising:

A) a skin layer on the inner and outer surface of said molding, comprising an electrically conductive plastic molding composition A comprising a first base polymer; and B) a core disposed between the skin layer on the inner and outer layer of said molding comprising a plastic molding composition B comprising a second base polymer, wherein the molding composition A differs from the molding composition B. The molding may be a connector, for example a connector used in a fuel-line system for connecting plastic pipes and other assemblies.

20 Claims, 1 Drawing Sheet

PLASTIC MOLDING HAVING TWO OR MORE LAYERS AND ANTISTATIC PROPERTIES

BACKGROUND OF THE INVENTION

1. Field of the Invention

The present invention is a reinforced molding, for example a connector, such as a quick connector, suitable for use in a fuel-line system, particularly for use in an automobile. The reinforced molding of the present invention may be an injection-molded connector between plastic pipes (in particular those of fuel lines) as well as a molding used in other assemblies (e.g. injection rail, metal pipes, fuel filter, other plastic pipes or the like). Specifications for quick connectors are provided by SAE J2044.

2. Discussion of the Background

Generally, the flow of a substance over a plastic surface can cause a build-up of a static electrical charge on the plastic surface. Such plastic surfaces may include, for example, fuel lines in automobiles, and other types of plastic piping used to convey liquids and solids, and/or plastic components of piping used to convey liquids or solids. If the static electrical charge build-up is sufficiently great, sudden electrical discharges can result, which can cause various problems, such as degradation of the plastic surface, and/or ignition of the solids or liquids conveyed therein. For example, in internal combustion engine powered motor vehicles, high levels of static electrical charge arise in fuel-line systems as a result of the flow of fuel. This can lead to sudden electrical discharges resulting in the formation of perforations in the fuel-line wall, through which the fuel can escape. The fuel can then ignite if it contacts hot components within the engine compartment or the exhaust system, thereby causing a fire in the motor vehicle.

In order to avoid this problem, all of the components of the system, and therefore also the connectors, should be conductive. This requirement means that a conducting connection must first be provided between the individual components of the system, and second, a conducting connection must be provided between the system and an electrical "ground." In the case of an automotive fuel line, for example, an electrical connection should be maintained between the motor vehicle chassis and the components of the fuel-line system. In this way, the motor vehicle chassis and the components of the pipeline system are maintained at the same electrical potential, which prevents the build-up of electrical charge in the fuel-line system.

JP-A 207154/95 proposes producing connectors for fuel-line systems from a molding composition based on nylon-11 or nylon-12, in each case comprising from 5 to 20% by weight of carbon fibers and from 5 to 25% by weight of glass fibers. However, these molding compositions have poor flowability because of their high fiber content, which makes it considerably more difficult to produce small volume injection-molded items. These molding difficulties are further exacerbated if the mold has two or more cavities (i.e., molds used in producing fuel-line quick connectors). The longer flow paths in such molds make it even more important for the molding composition to have good flowability.

However, replacing the carbon fibers in the molding compositions of JP-A 207154/95 with a conductive black filler to improve the electrical conductivity of the molding eliminates some of the reinforcement in the composition, thereby weakening the molding. Furthermore, the amount of carbon black required generally increases the melt viscosity of the composition, which in turn adversely affects the filling of the cavity during injection molding. In addition, such compositions also exhibit lower impact strength.

A multi-layer structure is described in U.S. Pat. No. 5,798,048 for a plastic fuel filter housing. However, that publication does not relate to reinforced molding compositions, or with the problem of precisely reproducing finely structured surfaces from a mold.

The object of the present invention is therefore to provide plastic moldings such as connectors which are conductive and easily injection molded, and in which surface details, e.g. protrusions, recesses, grooves for O-rings, etc. can be reproduced with precision from the mold. At the same time, the molding should have sufficient fiber reinforcement to achieve the desired stiffness.

SUMMARY OF THE INVENTION

This object of the present invention may be achieved by a connector having a continuous conductive path from the inner to the outer surface and comprising:

A) a skin layer on the inner and outer surface of said molding, comprising an electrically conductive molding composition A; and B) a core disposed between the skin layer on the inner and outer layer of said molding comprising a plastic molding composition B which differs from A.

DETAILED DESCRIPTION OF THE INVENTION

Figure 1:
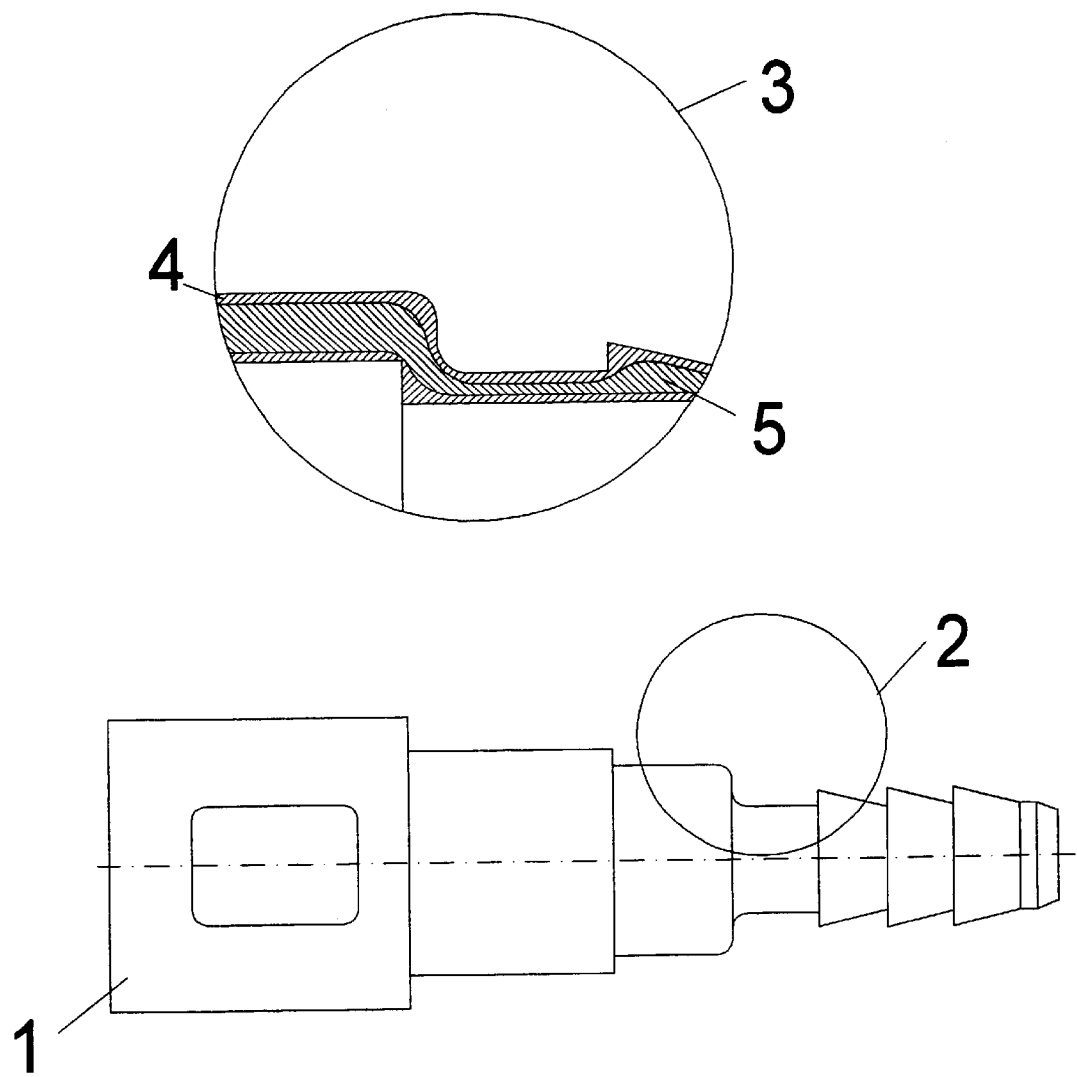
FIG. 1 shows a side view and cross section views of an example of a reinforced molding according to the present invention.

FIG. 1 shows a side view of an example of an embodiment of a novel reinforced molding (1) of the present invention. The section (2) of the wall cross section has been enlarged above (3). As shown in the enlarged cross-section view (3), the core (5) comprising reinforced molding composition B is substantially enclosed by the skin layer (4) comprising molding composition A.

It is preferable for the molding composition A comprising the skin layer to be essentially free from reinforcing materials such as glass fibers. Specifically, it should not comprise more than about 15% by weight, preferably not more than 10% by weight and particularly preferably not more than 5% by weight of reinforcing material. It is particularly preferred that molding composition A contain no reinforcing material at all.

Molding compositions A and B may be composed of the same or different base polymers. By base polymers, we mean the polymer or polymers which comprise the polymeric matrix which provides the structure of the molding. For example, the base polymer of molding composition A forms the skin layers of the molding. Likewise, the base polymer of molding composition B forms the core layer of the molding. In addition to the base polymer, the molding composition A may also contain an electrically conductive additive, and molding composition B may also contain a reinforcing material. It is preferable that the polymer combinations of the present invention be mutually compatible molding compositions or molding compositions modified with compatibilizers. The base polymers used in molding compositions A and B may be selected based on the general objectives pursued:

a) Reducing the cost of the polymer base. In this case, component B may be composed of a molding composition which is less expensive than that of component A;

b) Increasing the barrier properties of the ultimate molding with respect to the chemicals (i.e., fuel or individual components of fuel) with which the molding is expected to come in contact. By barrier properties, we mean the properties of a material whereby the rate of permeation of a penetrant chemical (i.e., fuel) through the material is slowed, for example by virtue of the low solubility and/or diffusivity of the penetrant chemical in the barrier material. For example, the material combinations used in molding compositions A and B may be the same as that used for multilayer pipes having two or more layers, as is described in the following patents and patent applications, incorporated herein by reference:

DE-A or DE-C 40 01 125, 40 06 870, 41 12 662, 41 12 668, 41 37 430, 41 37 431, 41 37 434, 42 07 125, 42 14 383, 42 15 608, 42 15 609, 42 40 658, 43 02 628, 43 10 884, 43 26 130, 43 36 289, 43 36 290, 43 36 291, 44 10 148 and 195 07 025, and also WO-A-93/21466, WO-A-94/18 485, EP-A-0 198 728 and EP-A-0 558 373;

c) Stiffening the molding by using a highly fiber-filled molding composition as material for component B.

Component A may be a molding composition comprising any thermoplastic resin, for example polyamides, polyesters, polyolefins, polysulfones, polyethersulfones, polyarylene oxides, polyimides, polyacrylates, polymethacrylates, polyurethanes, polycarbonates, etc. Polyamides, polyesters, and polyolefins are preferred thermoplastic resins, and polyamides are an especially preferred thermoplastic resin.

Component B may be, for example molding compositions based on polyamides, polyolefins, thermoplastic polyesters, fluoropolymers, polyoxymethylene, polysulfones, polyethersulfones, polyarylene oxides, polyimides, polyacrylates, polymethacrylates, polyurethanes, polycarbonates, or EVOH. Polyamides, polyolefins, thermoplastic polyesters, fluoropolymers, polyoxymethylenes and EVOH resins are preferred thermoplastic resins, and polyamides are an especially preferred thermoplastic resin. An example of a polyamide p-xylylenediamine (e.g. nylon-MXD6).

Other polyamides which may be used are mainly aliphatic homo- or copolyamides, for example nylon-4,6, -6,6, -6,12, -8,10, or -10,10, or the like, preferably nylon-6, -10,12, -11, -12, and also -12,12. (The terms for the polyamides follow the International standard in which the first number is the number of carbon atoms in the starting diamine and the last number is the number of carbon atoms in the dicarboxylic acid. If only one figure is mentioned, this means that the starting material for the polyamide is an α,ω-aminocarboxylic acid or its derivative lactam, as described in H. Domininghaus, Die Kunststoffe und ihre Eigenschaften (Plastics and Their Properties), p. 272, VDI-Verlag, (1976).)

The polyamides of the present invention may also be copolyamides, containing, for example, adipic acid, sebacic acid, suberic acid, isophthalic acid or terephthalic acid as coacids and, respectively, bis(4-aminocyclohexyl)methane, trimethylhexamethylenediamine, hexamethylenediamine or the like as codiamines.

The preparation of such polyamides is known (e.g.: D. B. Jacobs, J. Zimmermann, Polymerization Processes, pp. 424–467: Interscience Publishers, New York (1977); DE-B21 52 194).

The polyamides may be used alone or in mixtures.

Other suitable polyamides are mixed aliphatic/aromatic polycondensates, e.g. as described in U.S. Pat. Nos. 2,071,250, 2,071,251, 2,130,523, 2,130,948, 2,241,322, 2,312,966, 2,512,606, 3,393,210 or in Kirk-Othmer, Encyclopedia of Chemical Technology, 3rd ed., Vol. 18, Wiley & Sons (1982), pp. 328 and 435. Other polycondensates which may be used are poly(etheresteramides) and poly(etheramides). Products of this type, for example, are described in DE-A 27 12 987, 25 23 991 and 30 06 961.

The number-average molecular weight of the polyamides may be above 4000, preferably above 10,000, and preferably have a relative viscosity ($\eta_{rel}$) in the range of from 1.65 to 2.4.

The polyamide molding compositions may also comprise up to 40% by weight of other thermoplastics as long as these other thermoplastics do not impair the properties of the moldings of the present invention. In particular, such thermoplastics may include polycarbonate polymers (H. Schnell, Chemistry and Physics of Polycarbonates, Interscience Publishers, New York (1981)), acrylonitrile-styrene-butadiene polymers (Houben-Weyl, Methoden der organischen Chemie (Methods of organic chemistry), Vol. 14/1, Georg Thieme Verlag Stuttgart, pp. 393–406; Ullmanns Encyclopadie der technischen Chemie (Ullmann's Encyclopedia of Industrial Chemistry), 4th edition, Vol. 19, Verlag Chemie Weinheim (1981), pp. 279–284), acrylonitrile-styrene-acrylate polymers (Ullmanns Encyclopadie der technischen Chemie, 4th edition, Vol. 19, Verlag Chemie Weinheim (1981), pp. 277–295), acrylonitrile-styrene copolymers (Ullmanns Encyclopadie der technischen Chemie, 4th edition, Vol. 19, Verlag Chemie Weinheim (1981), pp. 273 et seq.) or polyphenylene ethers polymers (DE-A 32 24 691 and 32 24 692, U.S. Pat. Nos. 3,306,874, 3,306,875 and 4,028,341).

The polyamides may be impact-modified if desired. Examples of suitable impact modifiers are ethylene-propylene copolymers and ethylene-propylene-diene copolymers (EP-A-0 295 076), polypentenylene, polyoctenylene and random- or block-structured copolymers made from alkenylaromatic compounds with aliphatic olefins or with aliphatic dienes (EP-A-0 261 748). Other impact-modifying rubbers which may be used are core-shell rubbers with an elastomeric core made from (meth)acrylate rubber, from butadiene rubber or from styrene-butadiene rubber with, in each case, a glass transition temperature $T_g < -10°$ C. The core may be crosslinked. The shell may be composed of styrene and/or methyl methacrylate and/or other unsaturated monomers (i.e., those described in DE-A 21 44 528, 37 28 685). The amount of the impact-modifying component used in the molding composition should be selected so that the desired properties are not impaired.

Polyolefins which may be used in the molding compositions of the present invention are homopolymers or copolymers of α-olefins having from 2 to 12 carbon atoms, for example ethylene, propene, 1-butene, 1-hexene or 1-octene.

Other suitable materials are copolymers or terpolymers which, in addition to the above monomers, may also contain other monomers, in particular dienes, such as ethylidenenorbornene, cyclopentadiene or butadiene.

Preferred polyolefins are polyethylene and polypropylene. Any commercially available grade of these polyolefins may be used in principle. For example, high-, medium- or low-density linear polyethylene, LDPE, copolymers of ethylene with relatively small amounts (up to a maximum of about 40% by weight) of comonomers, such as n-butyl acrylate, methyl methacrylate, maleic anhydride, styrene, vinyl alcohol, acrylic acid, glycidyl methacrylate or the like, isotactic or atactic homopolypropylene, random copolymers of propene with ethene and/or butene, ethylene-propylene block copolymers and the like may be used. Polyolefins of this type may also contain an impact-modifying component, e.g. EPM rubber or EPDM rubber or SEBS. They may also contain functional monomers, such as maleic anhydride, acrylic acid or vinyltrimethoxysilane grafts.

The thermoplastic polyesters have the following basic structure

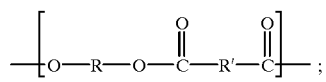

where R is a bivalent branched or unbranched aliphatic and/or cycloaliphatic radical having from 2 to 12, preferably from 2 to 8, carbon atoms in the carbon chain, and R' is a bivalent aromatic radical having from 6 to 20, preferably from 8 to 12, carbon atoms in the carbon skeleton.

Examples of the diols which may be used to prepare thermoplastic polyesters may include, for example, ethylene glycol, trimethylene glycol, tetramethylene glycol, hexamethylene glycol, neopentyl glycol, cyclohexanedimethanol and the like.

Up to 25 mol % of these diols may be replaced by a diol of the following general formula

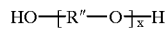

where R" is a bivalent radical having from 2 to 4 carbon atoms and x can be from 2 to 50. Preferred diols include ethylene glycol and tetramethylene glycol.

Examples of aromatic dicarboxylic acids which may be used to prepare the thermoplastic polyesters include, for example, terephthalic acid, isophthalic acid, 1,4-, 1,5-, 2,6- or 2,7-naphthalenedicarboxylic acid, diphenic acid, diphenyl ether 4,4'-dicarboxylic acid or polyester-forming derivatives thereof, e.g. dimethyl esters. Up to 20 mol % of these dicarboxylic acids may be replaced by aliphatic dicarboxylic acids, e.g. succinic acid, maleic acid, fumaric acid, sebacic acid, dodecanedioic acid, etc.

Methods for preparing thermoplastic polyesters are well known. See, for example, DE-A 24 07 155, 24 07 156; Ullmanns Encyclopadie der technischen Chemie, 4th edition, Vol. 19, pp. 65 et seq., Verlag Chemie GmbH, Weinheim 1980.

The polyesters of the present invention have a viscosity number (J value) in the range from 80 to 240 cm$^3$/g.

Preferred thermoplastic polyesters may include, for example, polyethylene terephthalate, polybutylene terephthalate, polyethylene 2,6-naphthalate and polybutylene 2,6-naphthalate. The polyesters may also be impact-modified.

Examples of suitable fluoropolymers which may be used in the molding compositions of the present invention include ethylene-tetrafluoroethylene copolymers (ETFE, e.g. Tefzel 200 from DuPont or Hostaflon ET 6235 from Hoechst), tetrafluoroethylene-hexafluoropropene-vinylidene fluoride terpolymers (THV; e.g. THV 500 from Dyneon), ethylenechlorotrifluoroethylene copolymers (ECTFE; e.g. Halar from Ausimont) and polyvinylidene fluoride (PVDF).

ETFE, THV and ECTFE are described, for example, in H. Domininghaus, Die Kunststoffe und ihre Eigenschaften, 4th edition, Section 2.1.7 (Fluorinated Plastics). The preparation and structure of polyvinylidene fluoride is likewise known (Hans R. Kricheldorf, Handbook of Polymer Synthesis, Part A, Verlag Marcel Dekker Inc., New York—Basle—Hong Kong, p. 191–192: Kunststoff-Handbuch (Plastics Handbook), 1st edition, Vol. XI, Carl Hanser Verlag Munich (1971), p. 403 et seq.).

It is also possible to use polymers based on polyvinylidene fluoride and having up to 40% by weight of other monomers. Such additional monomers may be, for example, trifluoroethylene, ethylene, propene and hexafluoropropene.

The polyvinylidene fluoride of the present invention generally has a melt flow index of less than 17 g/10 min., preferably from 2 to 13 g/10 min (DIN 53 735), measured at 230° C. with a load of 5 kg.

Examples of material combinations which may be used in the present invention are:

A=molding composition based on polyamide, in particular nylon-6, nylon-6,6, nylon-6,12, nylon-11 or nylon-12

B=PVDF, other fluoropolymer, polybutylene terephthalate or polybutylene naphthalate, EVOH or a polyamide compatible with A, for example a grade based on m- or p-xylylenediamine and adipic acid.

These polymers may be used either alone or in mixtures. Besides the impact modifiers described above, the molding compositions of the present invention may also contain conventional additives, such as processing aids, mold-release agents, stabilizers, flame retardants or mineral fillers, e.g. mica or kaolin.

The molding composition A is rendered conductive by compounding the base polymer with an electrically conductive additive. This may be done by any conventional method. For example, the base polymer may be compounded with the electrically conductive additive using a conventional single screw extruder, twin screw extruder, or other conventional polymer compounding equipment Examples of electrically conductive additives which may be used are conductive carbon black, metal flakes, metal powders, metallized glass beads, metal fibers, (e.g., stainless steel fibers), metallized whiskers, carbon fibers (which may be metallized), intrinsically conductive polymers and, in particular, graphite fibrils. Mixtures of different conductive additives may also be used. The surface resistance of the molding comprising the molding compositions of the present invention should be low enough that electrical charges can be reliably dissipated.

Graphite fibrils are described, for example, in Plastics World, November 1993, pp. 1011. Graphite fibrils are tiny fibers made from crystalline graphite with average diameters of not more than about 700 nm. The average diameter of graphite fibrils currently available commercially is on the order of 0.01 micron, with an L/D ratio of the order of 500:1–1000:1. Graphite fibrils as described in the WO applications Nos. 8603455, 8707559, 8907163, 9007023 and 9014221, and also in JP-A-03287821, are also suitable in principle for the purposes of the present invention.

The content of graphite fibrils in the molding composition may generally be from 1 to 30% by weight, preferably from 1.5 to 10% by weight and particularly preferably from 2 to 7% by weight.

In another preferred embodiment, the molding composition A comprises from 3 to 30% by weight, preferably from 10 to 25% by weight and particularly preferably from 16 to 20% by weight, of a conductive carbon black which has the following properties:

a) dibutyl phthalate (DBP) absorption of from 100 to 300 ml/100 g, preferably from 140 to 270 ml/100 g (ASTM D2414);

b) specific surface area of from 30 to 180 m$^2$/g, preferably from 40 to 140 m$^2$/g (measured by nitrogen absorption according to ASTM D3037);

c) ash content below 0.1% by weight, preferably below 0.06% by weight, particularly preferably below 0.04% by weight (ASTM D1506);

d) grit content of not more than 25 ppm, preferably not more than 15 ppm and particularly preferably not more than 10 ppm.

For the purposes of the present invention, grit is hard, coke-like particles which are produced by cracking reactions during the preparation of the conductive carbon black.

This conductive carbon black is a specific grade whose properties differ from those of conventional conductive carbon blacks. For example, a typical commercially available EC carbon black (extra conductive carbon black) has a DBP absorption of 350 ml/100 g, a specific N$_2$ surface area of 1000 m$^2$/g and an ash content of 0.7% by weight. The molding compositions which contain this specific grade of conductive carbon black have improved heat-aging resistance, and also higher resistance to peroxide-containing fuels, compared to compositions containing other grades of conductive carbon black. Although the precise reason for this difference is not well known, it is likely that the difference in performance is connected with the differences in the surface structure of the carbon particles, resulting in different catalytic activity, and also that the ash content of the carbon black likewise has catalytic activity.

The carbon blacks used in the molding compositions of the present invention may be obtained, for example, by the MMM process. The MMM process is based on the partial combustion of oil (N. Probst, H. Smet, Kautschuk Gummi Kunststoffe (Rubber and Plastics), 7–8/95, pp. 509–511; N. Probst, H. Smet, GAK 11/96 (Volume 49), pp. 900–905). Such carbon black products are available commercially.

In another preferred embodiment, the molding composition A comprises, in addition to the conductive carbon black, from 0.1 to 20% by weight of carbon fibers, based on the total weight, a content of not more than 16% by weight, in particular not more than 12% by weight, being generally sufficient. Since the carbon fibers themselves contribute to the electrical conductivity, if carbon fibers are used, an amount of preferably from 5 to 18% by weight of carbon black may be used.

Carbon fibers are available commercially and are described in Römpp Chemie Lexikon (Römpp's Chemical Encyclopedia), 9th edition, pp. 228990, Thieme, Stuttgart, 1993, for example, and also in the references cited there.

The reinforcing materials of molding composition B may include conventional fillers such as glass microspheres, kaolin, wollastonite, talc, mica or calcium carbonate, or reinforcing materials in the form of fibers such as glass, carbon, mineral, metal, or polymer fibers. Reinforcing fibers are the preferred reinforcing material. Suitable reinforcing fibers are known, for example glass fibers, carbon fibers, aramid fibers, mineral fibers or whiskers, as are molding compositions containing such fibers. The upper limit of fiber content is set only by the need for the fiber-reinforced molding composition to retain sufficient flowability during the molding process.

If necessary, components A and B may be bonded with the aid of an intervening adhesion promoter. Such adhesion promoters are known.

The thickness of the skin layer and of the core layer is highly dependent on the rheology of the molding compositions, on the shape of the molding, and, of course, on the molding process parameters. The thickness of the skin layer should be at least sufficient for it to encapsulate at least the majority of the core, preferably a very large part of the core, and most preferably all of the core.

The novel reinforced moldings of the present invention may be produced by multi-component injection molding or by the mono-sandwich process.

The production of plastic items by multi-component injection molding is known (see, for example, Th. Zipp, Fließverhalten beim 2-Komponenten-Spritzgießen (Flow Behavior in 2-Component Injection Molding), Dissertation, RWTH Aachen, 1992). When using two components A and B, the conductive component A is first put in place and the nonconductive component B is then injected. A procedure of this type produces the layer sequence A/B/A, viewing a section through the wall, but at the beginning and end of the flow path the conductive layer A has no interruption, since component B fills only the core region. This ensures continuous transfer of electrical charges from the inside of the moding to the outside of the molding.

The mono-sandwich process is also known (see, for example C. Jaroschke, Neue Wege beim Sandwich-Spritzgießen (New Paths in Sandwich Injection Molding), Kunststoffe 83 (1993) 7, pp. 519–521).

The reinforced molding of the present invention may be very stiff, e.g., when the core is a highly filled molding composition, but nevertheless any surface details and profiling, such as protrusions, etc may be easily formed because the skin layers have good flowability during the molding process. In addition, because the core layer need not contain a conductivity additive, considerable material and cost savings may also achieved.

The priority document of the present application, German patent application 10025707.0 filed May 26, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A connector, comprising a wall which defines a cavity, said wall having an outer surface and an inner surface facing the cavity, wherein the wall comprises:

A) a skin layer on the inner and outer surface of the wall, comprising an electrically conductive plastic molding composition A comprising a first base polymer and an electrically conductive additive; and B) a core layer disposed between the skin layer on the inner surface of the wall and the skin layer on the outer surface of the wall comprising a plastic molding composition B comprising a second base polymer, wherein the molding composition A differs from the molding composition B, and the skin layer on the inner and outer surface provide a continuously conductive path from the inner surface to the outer surface of the connector.

2. The connector of claim 1, wherein the molding composition A is essentially free from glass fibers.

3. The connector of claim 1, wherein the molding composition B further comprises a reinforcing fiber.

4. The connector of claim 3, wherein said reinforcing fiber is selected from the group consisting of glass fibers, carbon fibers, aramid fibers, mineral fibers, whiskers, and combinations thereof.

5. The connector of claim 1, wherein the first base polymer and the second base polymer are the same.

6. The connector of claim 2, wherein the first base polymer and the second base polymer are the same.

7. The connector of claim 1, wherein the first base polymer and the second base polymer are different.

8. The connector of claim 2, wherein first base polymer and the second base polymer are different.

9. The connector of claim 1, wherein the molding composition B is a barrier to the diffusion of a fuel or components of the fuel.

10. The connector of claim 1, wherein the first base polymer is selected from the group consisting of a polyamide, a thermoplastic polyester, and a polyolefin, and the second base polymer is selected from the group consisting of a polyamide, a polyolefin, a thermoplastic polyester, a fluoropolymer, a polyoxymethylene and an EVOH.

11. The connector of claim 1, wherein the molding composition A further comprises an electrically conductive additive selected from the group consisting of conductive black, a metal flake, a metal powder, a metallized glass bead, a metal fiber, a metallized whisker, a carbon fiber, a metallized carbon fiber, an intrinsically conductive polymer, a graphite fibril, and mixtures thereof.

12. The connector of claim 11, wherein the molding composition A comprises from 3 to 30% by weight of a conductive black having:
   a) a DBP absorption of from 100 to 300 ml/100 g;
   b) a specific surface area of from 30 to 180 $m^2/g$;
   c) an ash content below 0.1% by weight; and
   d) a grit content of not more than 25 ppm.

13. The connector of claim 11, wherein the molding composition A comprises a conductive black and from 0.1 to 20% by weight of carbon fibers.

14. The connector of claim 12, wherein the molding composition A further comprises from 0.1 to 20% by weight of carbon fibers.

15. The connector of claim 13, wherein the molding composition A comprises from 5 to 18% by weight of conductive black.

16. The connector of claim 14, wherein the molding composition A comprises from 5 to 18% by weight of conductive black.

17. The connector of claim 1, wherein an adhesion promoter is disposed between said skin layer and said core, thereby bonding said skin layer and said core together.

18. The connector of claim 1, produced by a process comprising multi-component injection molding or a mono-sandwich process.

19. A fuel-line system comprising the connector of claim 1.

20. A reinforced molding, comprising a wall which defines a cavity, said wall having an outer surface and an inner surface facing the cavity, wherein the wall comprises:
   A) a skin layer on the inner and outer surface of said reinforced molding, comprising an electrically conductive plastic molding composition A comprising a first base polymer and an electrically conductive additive; and
   B) a core layer disposed between the skin layer on the inner surface of the wall and the skin layer on the outer surface of the wall comprising a plastic molding composition B which differs from molding composition A, and which comprises a second base polymer and at least one reinforcing material, wherein the skin layer on the inner and outer surface provide a continuously conductive path from the inner surface to the outer surface of the reinforced molding.

* * * * *